C. DE KANDO.
POLYPHASE MOTOR CASCADE DRIVING SYSTEM.
APPLICATION FILED DEC. 13, 1906.

1,046,601.

Patented Dec. 10, 1912.

2 SHEETS—SHEET 1.

WITNESSES

INVENTOR
COLOMAN DE KANDO
BY HIS ATTORNEYS

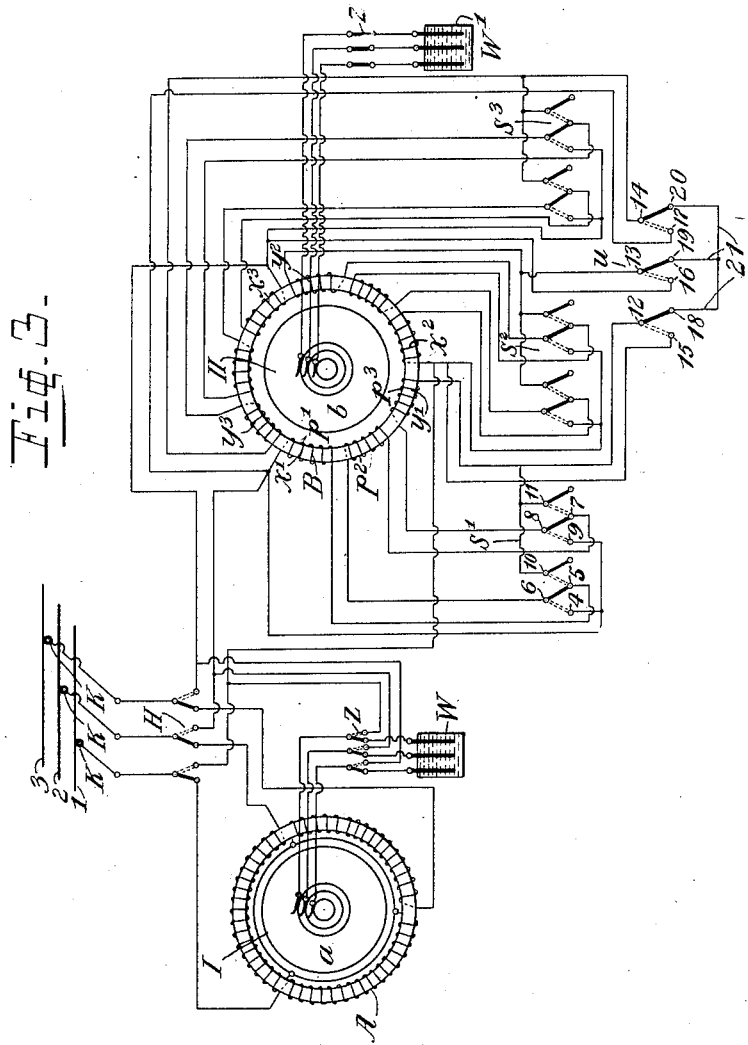

UNITED STATES PATENT OFFICE.

COLOMAN DE KANDO, OF BUDAPEST, AUSTRIA-HUNGARY.

POLYPHASE-MOTOR CASCADE DRIVING SYSTEM.

1,046,601.  Specification of Letters Patent.  Patented Dec. 10, 1912.

Application filed December 13, 1906. Serial No. 347,573.

*To all whom it may concern:*

Be it known that I, COLOMAN DE KANDO, a subject of the King of Hungary, and resident of Felsö erdösor 12, Budapest, in the Empire of Austria-Hungary, have invented certain new and useful Improvements in or Relating to Polyphase-Motor Cascade Driving Systems, and hereby declare the following to be a full, clear, and exact description of the invention, such as will enable others skilled in the art to which it appertains to make and use the same.

My invention relates to the arrangement for connecting two or more three-phase motors, for the purpose of regulating the speed in electric railways, which enables high tension motors to be worked either in cascade connection or independently of each other.

Figure 1:
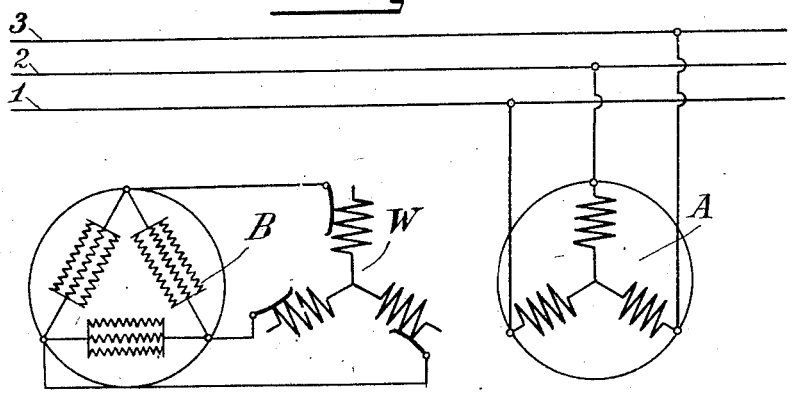
Figure 1:
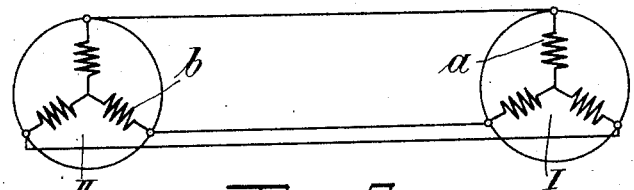
Figure 2:
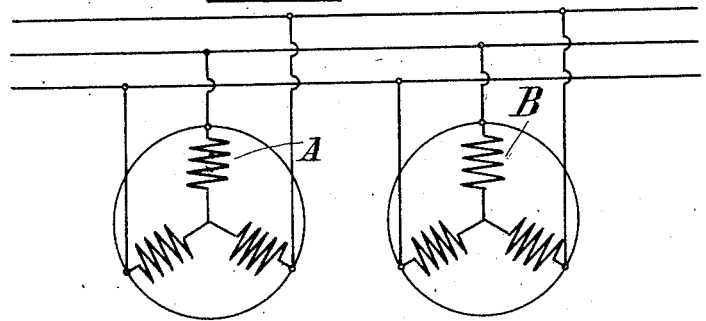
Figure 2:
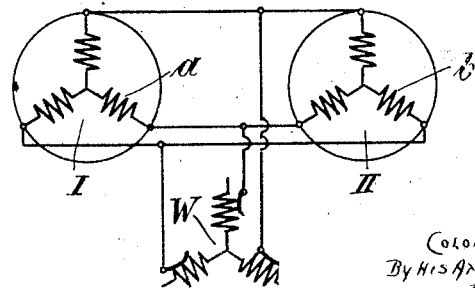

In the drawings Figure 1 is a diagram of two motors connected in cascade relation. Fig. 2 is a similar diagram with the motors in parallel. Fig. 3 is a connection diagram showing more in detail an arrangement of motors and switches in accordance with my invention.

The problem to be solved is as follows: Two three-phase motors I and II (Fig. 1) are given. The source of current is a high pressure line 1, 2, 3 of say 3000 volts.

a. The two motors are to be started and worked in cascade connection by means of the starting switch or resistance W (Fig. 1).

b. The two motors are to be started and worked switched together in parallel or independently of each other (Fig. 2).

It is well known that starting switches or resistances can be made in practice only for considerably lower pressures than those that can be used for current collectors of the line wires, or for the direct feeding of motors. For instance, practical installations can be shown in which the motors receive a pressure of 3000 volts from the line wire, while the secondary pressure of the motors must be considerably lower, for instance not over 600 volts, in order to enable the connection to be effected (Fig. 2). In order however to enable cascade connection to be carried out, the primary winding B of the motor II would also have to be calculated for 600 volts, which, however, would then make it impossible to connect as shown in Fig. 2, as the primary winding B, if calculated for 600 volts, would not be suitable for connecting direct to high pressure lines 1, 2, 3, of 3.000 volts. In order to overcome this difficulty, it had already been suggested to reduce the pressure in a suitable manner either for the second motor or for the starting resistance by switching in a transformer. The arrangement of a transformer is, however, a complicated matter, and it is of great importance in railway working to economize as much weight and space as possible, and to do away with any causes of disturbance, and therefore it is often desirable to avoid the arrangement of such a transformer, or of several of them, when more than one motor couple is to be used.

The subject of my invention is an arrangement for connecting or switching, which enables the problem mentioned in the beginning to be solved, without any transformer being used. In the new switching arrangement the chief feature is that the separate phases of the high pressure winding of the motors are divided into several sections which are connected with a suitable switch in such manner that, when the motor is to be connected to the high pressure line, they are switched in series, but when the motor, as a driven motor, is to be supplied from the lower secondary pressure of the leading or driving motor, they are switched in parallel. In view of the great difference between the primary and secondary pressure, an extreme sub-division of the winding would be required, thus for instance with a primary pressure of 3.000 volts and a secondary pressure of about 600 volts, it would be necessary to have a quintuple sub-division.

I have provided means for overcoming the objectional features above enumerated, an embodiment of which is illustrated in the accompanying drawings.

Fig. 3 shows a connection diagram of a construction according to this invention for two three-phase motors I, II.

The stator B of the motor II is wound for high pressure, the parts $x^1$, $y^1$, $x^2$, $y^2$, $x^3$, $y^3$, corresponding to the three phases. The single phases of the stator winding are divided into several sections, in the drawing into three, each, the said sections being connected to the switches $S^1$, $S^2$, $S^3$. By means of these switches, the three sections of the phases can be connected in series or in parallel, and in such manner that, when the switches $S^1$, $S^2$, $S^3$ are in the positions shown in full, the sections of each phase are connected in series, while the position of the said switches shown dotted corresponds to the parallel connection of the section. With reference to the phase $x^1$, $y^1$, the circuit for instance, for the position of the switch $S^1$, shown in full lines, is as follows: $x^1$, $p^1$, 5 6 $p^2$, $f^8$ $p^3$ $y^1$, so that the current passes consecutively through the coils $p^1$ $p^2$ $p^3$, while in the dotted position the ends 6 and 8 of the coils $p^2$ $p^3$, are connected at 4 and 9 to $x^1$, and the other ends 5 and 7 of the coils $p^1$ $p^2$ are connected at 5 10 and 7 11 to $y^1$, so that the three coils are connected in parallel. The same change of connection can be effected by the switch $S^2$ or $S^3$ in the phase $x^2$, $y^2$, or $x^3$, $y^3$. The ends of the single phases of the stator winding are guided to a switch U, the ends $y^1$, $y^2$, $y^3$, being connected to the switch levers 12, 13, 14, while the ends $x^2$, $x^3$ or $x^1$ are connected to the contacts 15 16 or 17. The contacts 18 19 and 20 are electrically connected together by 21.

When the switch U is in the position shown in full lines, the ends $y^1$, $y^2$, $y^3$ of the three phases are connected together by 12 18 or 13 19 or 14 20 and 21, so that the phases are connected in the shape of a star. When the switch U is brought into the dotted position, $y^1$ is connected by 12 and 15 to $x^2$; $y^2$ by 13 and 16 to $x^3$ and finally $y^3$ by 14 and 17 to $x^1$, so that a triangle connection is produced. The switches $S^1$ $S^2$ $S^3$ and U are preferably mechanically connected, so that they can be operated simultaneously. The rotor $b$ of the motor II can be connected to the starting switch $W^1$ by means of the switch $z^1$. The current collectors K which collect the current from the high pressure line 1 2 3, can be connected by means of the switch H, either to the primary winding A of the motor I, or to the primary winding B of the motor II, according as the one or the other motor is to be supplied with electricity direct from the high pressure line. The switch $z^1$, when in its position shown in full lines, connects the rotor $a$ of the motor I, to the resistance W, while in the dotted position of the switch Z, the rotor of the motor I is connected to the poles $x^1$, $x^2$, $x^3$ of the stator winding B of the motor II.

When it is desired to start the motor I, the rotor of the same is connected by means to the switch $Z^1$ to the starting resistance W. If the motor II is to work independently of I, then, after moving the switch H, and with the switches $S^1$ $S^2$ $S^3$ and U in the positions shown in full lines, the motor is started by means of the starting resistance $W^1$.

When the two motors have the same number of poles, they can be both connected simultaneously to the high pressure line, as diagrammatically shown in Fig. 2 but if the number of their poles is different, they can be switched in alternately for obtaining two different speeds. If for obtaining a smaller speed, the motor II is to be connected to the motor I in cascade, the switches Z $S^1$ $S^2$ $S^3$ and U are moved into the position shown dotted. In this way, on the one hand, the rotor of the motor I is connected to the stator of the motor II, and, on the other hand, the section of separate phases of the stator winding are connected in parallel, and thus the triangle connection produced, so that the stator winding B, wound for the high pressure, can be supplied with current by the low pressure current of the rotor $a$. As the switch Z is operated simultaneously with the switches $S^1$, $S^2$, $S^3$ and U, all the switches can be connected mechanically or operated by means of relays or by compressed air simultaneously or in a given sequence. The cascade connection can also be produced by connecting the rotor $a$ to the rotor $b$, and the stator B of the motor II to the starting resistance after the parallel and triangle connection has been effected as indicated in Fig. 1. Normally it is sufficient to provide only the stator winding of one motor II with the device for switching in series and parallel or star and triangle, but the two motors could also be built in the same way. The new switching device can of course be applied in a corresponding manner to more than two motors.

Having now described my invention what I claim is:—

1. In an induction-motor driving system, induction-motors having their primaries insulated for high pressure and their secondaries wound for low pressure, the primary of one being wound in sections definitely related to the pressure of the secondary element, a rheostat suitable for the pressure of the secondary, means for grouping the primary sections for connection either for the high pressure or for the rheostat pressure, means for connecting said sectioned primary to the high pressure line and means for connecting the secondary of said other motor either to said sectioned primary or to said rheostat.

2. In an induction-motor driving system, a high pressure line, motors with primaries wound for line pressure and secondaries for a lower pressure, the primary winding of one or more motors being subdivided into sections definitely related to the secondary pressure, switches for grouping the subdivisions of the primary windings for connection alternately for the line pressure and for the secondary pressure, means for connecting such motor as a secondary motor in a cascade system when its windings are grouped for secondary pressure, and means for connecting the motor directly to line when its windings are grouped for line pressure.

3. In an induction-motor driving system, two or more induction motors having their primaries insulated for high pressure and their secondaries wound for a lower pressure, the primaries of one of said motors being wound in sections adapted when connected in one relation to work efficiently at the high pressure and in another relation to work efficiently at the pressure of the secondary of another motor, means for grouping the sections of said primary winding at will for either pressure and means for connecting the motor with its subdivided windings grouped for low pressure as secondary motor in cascade with a motor having its windings suited to high pressure.

4. In an induction-motor driving system, two or more induction motors having their primaries wound for high pressure and their secondaries for a definitely related low pressure, one of said primary windings being divided into sections, and means for connecting said sections in parallel in each phase and means for connecting the so connected motor as secondary motor in a cascade group.

5. In an induction motor driving system, a high pressure line, three-phase motors having their primaries adapted for connection to said line when the phases are arranged in star relation, one or more of said motors having each of its primary windings subdivided into equal sections and the secondaries of all the motors wound for the pressure of each of said sections, switches connecting said sections in series and phases in star relation for operation from the high pressure line and said sections in parallel and the phases in delta relation for operation in cascade, and means for connecting and controlling the motors in cascade, the motor having subdivided windings acting as secondary motor in the cascade group.

In testimony whereof I affix my signature to this specification, in the presence of two witnesses.

COLOMAN DE KANDO.

Witnesses:
EUGENE HARRANY,
CHARLES E. MATINE.

---

It is hereby certified that in Letters Patent No. 1,046,601, granted December 10, 1912, upon the application of Coloman de Kando, of Budapest, Austria-Hungary, for an improvement in "Polyphase-Motor Cascade Driving Systems," an error appears in the printed specification requiring correction as follows: Page 2, line 35, for the word "switch" read *resistance;* and that the said Letters Patent should be read with this correction therein that the same may conform to the record of the case in the Patent Office.

Signed and sealed this 28th day of January, A. D., 1913.

[SEAL.]

C. C. BILLINGS,
*Acting Commissioner of Patents.*